(12) United States Patent
Ando et al.

(10) Patent No.: US 7,059,815 B2
(45) Date of Patent: Jun. 13, 2006

(54) ELASTIC FASTENER

(75) Inventors: Toshio Ando, Toyohashi (JP); Hiroyuki Masugata, Toyohashi (JP)

(73) Assignee: Newfrey LLC, Newark, DE (US)

( * ) Notice: Subject to any disclaimer, the term of this patent is extended or adjusted under 35 U.S.C. 154(b) by 28 days.

(21) Appl. No.: 10/812,383

(22) Filed: Mar. 29, 2004

(65) Prior Publication Data

US 2004/0179920 A1    Sep. 16, 2004

Related U.S. Application Data

(63) Continuation of application No. PCT/US02/30736, filed on Sep. 27, 2002.

(30) Foreign Application Priority Data

Oct. 4, 2001    (JP) .............................. 2001-308981

(51) Int. Cl.
    *F16B 13/04*    (2006.01)
(52) U.S. Cl. ........................................ 411/34; 411/182
(58) Field of Classification Search ................ 411/501, 411/908, 182, 183, 34, 427
    See application file for complete search history.

(56) References Cited

U.S. PATENT DOCUMENTS 3,489,312 A  *  1/1970  Hunckler et al. ........... 220/235
4,478,545 A  *  10/1984 Mizusawa et al. ......... 411/80.1
5,332,347 A  *  7/1994  Kimisawa .................... 411/182
5,636,953 A      6/1997  Jaeger et al.
6,146,076 A  *  11/2000 Bodin ......................... 411/433
6,443,678 B1 *  9/2002  Mizuno et al. ............. 411/182
2001/0003570 A1    6/2001  Mizuno et al.

FOREIGN PATENT DOCUMENTS

| DE | 200 22 001 U1 | 4/2001 |
| GB | 700379 | 4/1951 |
| JP | 59-146607 | 10/1984 |
| JP | 11223207 A | 8/1999 |

* cited by examiner

*Primary Examiner*—William L. Miller
(74) *Attorney, Agent, or Firm*—Harness, Dickey & Pierce, P.L.C.

(57) ABSTRACT

An elastic fastener 1 comprises a hollow tubular portion 7, an internally threaded portion 2 provided at one of the ends of the tubular portion 7, and a flange 9 formed at the other end of the tubular portion 7. The tubular portion 7 and the flange 9 are integrally formed of an elastomeric material, such as a styrene-based elastomer, a polyamide-based elastomer and a polyester-based elastomer. The internally threaded portion 2 is formed of a rigid resin material such as a polycarbonate resin. The internally threaded portion 2 is integrally fixed to the tubular portion 7 in a hole of the tubular portion.

13 Claims, 5 Drawing Sheets

ELASTIC FASTENER

CROSS REFERENCE TO OTHER APPLICATIONS

The present application is a continuation of pending International patent application PCT/US02/30736 filed on Sep. 27, 2002 which designates the United States, and which claims priority of Japanese 2001-308981 filed on Oct. 4, 2001.

FIELD OF THE INVENTION

The present invention relates to an elastic fastener usable as a blind nut and capable of being fastened to a workpiece, such as a panel, from one side thereof.

BACKGROUND OF THE INVENTION

There has been well known a metal blind nut comprising a hollow tubular portion, an internally threaded portion formed at one of the ends of the tubular portion and a flange formed at the other end of the tubular portion, wherein the tubular portion is adapted to be buckled or deformed by inserting the tubular portion into a hole of a workpiece so that the blind nut is fastened to the workpiece by the deformed portion and the flange (for example, Japanese Utility Model Laid-Open No. 59-146607). The blind nut can be handled from one side of a workpiece in its fastening operation, and thereby conveniently fastened to the workpiece such as a panel even if an operator cannot access to the rear side of the workpiece. A bolt can be screwed into the blind nut fastened to the workpiece. For example, a headed bolt can be screwed into the internally threaded portion to attach various members such as an ornamental member to the workpiece.

Japanese Patent Laid-Open No. 11-223207 discloses a blind nut type elastic fastener which is not a metal blind nut. This elastic fastener comprises a hollow tubular portion, an internally threaded portion provided at one of the ends of the tubular portion and a flange formed at the other end of the tubular portion. Further, the tubular portion and the flange are formed of an elastic material such as a chloroprene rubber. Thus, the elastic fastener has excellent characteristics in vibration resistance and water tightness as compared to the metal blind nut.

In the elastic fastener disclosed in Japanese Patent Laid-Open No. 11-223207, the tubular portion and the flange are formed of a chloroprene rubber, but the internally threaded portion is formed as a metal nut. Thus, the elastic fastener still is involved with a challenge to be improved in terms of weight reduction, and is not adequate to recycle because it mixedly includes metal and rubber. Further, an adhesive is essential to attach the internally threaded portion to the tubular potion because these portions are made of metal and rubber, respectively. In addition, the chloroprene rubber as a material of the tubular portion and flange leads to long forming time and low ozone resistance.

It is therefore an object of the present invention to provide an elastic fastener capable of achieving sufficient weight reduction, elimination of the need for adhesive, reduced forming time, and enhanced ozone and vibration resistances.

SUMMARY OF THE INVENTION

In order to achieve the above object, according to the present invention, there is provided an elastic fastener comprising a hollow tubular portion, an internally threaded portion provided at one of the ends of the tubular portion, and a flange formed at the other end of the tubular portion. The tubular portion and the flange are integrally formed with each other and made of an elastomeric material selected from the group consisting of a styrene-based elastomer, a polyamide-based elastomer, a polyester-based elastomer, a urethane-based elastomer and an olefin-based elastomer. The internally threaded portion is formed of a rigid resin material selected from the group consisting of a polycarbonate resin, a styrene-based resin, an acrylic-based resin, a polyester-based resin, a nylon-based resin, a modified PPE resin and a polymer alloy (polyblend) comprising polycarbonate. The internally threaded portion has a nut shape. Further, the internally threaded portion is integrally fixed to the tubular portion in a hole of the tubular portion.

As above, the tubular portion and the flange are formed of the specific elastomeric material, and the internally threaded portion is formed of the specific rigid resin material (high-strength engineering plastic) without using any metal nut. Thus, an overall weight reduction of the elastic fastener can be sufficiently achieved (one-half or less of the weight of the conventional elastic fastener), and the availability of fusion bonding for joining the internally threaded portion to the tubular portion allows the need for adhesive to be eliminated. The tubular portion and the flange formed of the above materials can also achieve significantly reduced forming time (one-third or less of the forming time of the conventional elastic fastener) and enhanced ozone resistance, as compared to those formed of a chloroprene rubber. Further, it has been proved that the elastic fastener of the present invention was improved in vibration resistance.

In the above elastic fastener, it is preferable that the elastomeric material of the flange and the tubular portion has a JIS-A hardness of 40 to 90 degrees. Further, the flange and the tubular portion may be integrally formed to each other by injection molding. In addition, the internally threaded portion may be formed as a single piece by injection molding, and the internally threaded portion may be joined to the tubular portion by fusion bonding.

DETAILED DESCRIPTION OF THE PREFERRED EMBODIMENT

Figure 1:
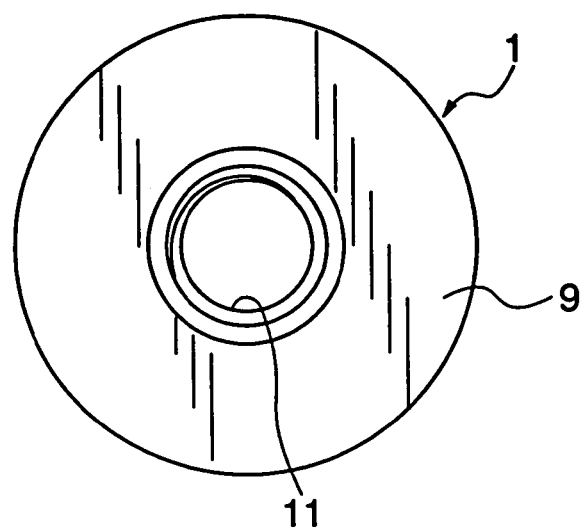
FIG. 1 is a top plan view of an elastic fastener according to the present invention.
Figure 2:
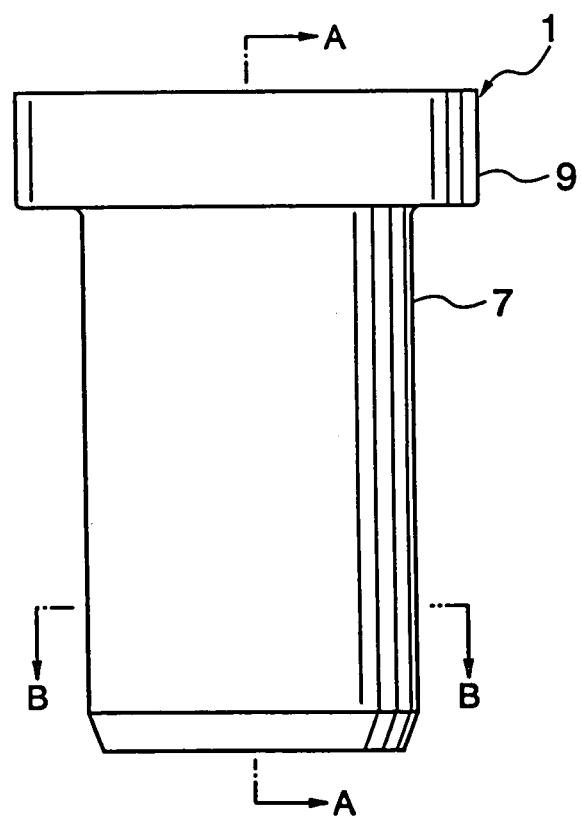
FIG. 2 is a front view of the elastic fastener of FIG. 1.
Figure 3:
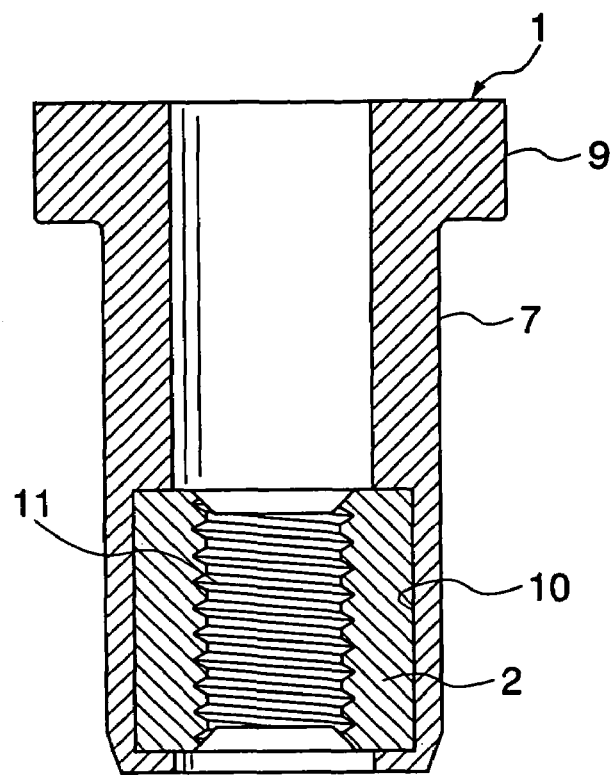
FIG. 3 is a sectional view of the elastic fastener taken along the line A—A of FIG. 2.
Figure 4:
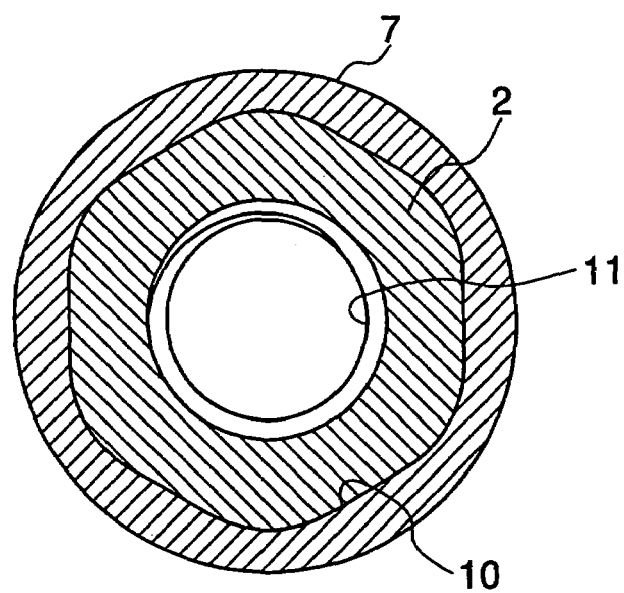
FIG. 4 is a sectional view of the elastic fastener taken along the line B—B of FIG. 2.
Figure 5:
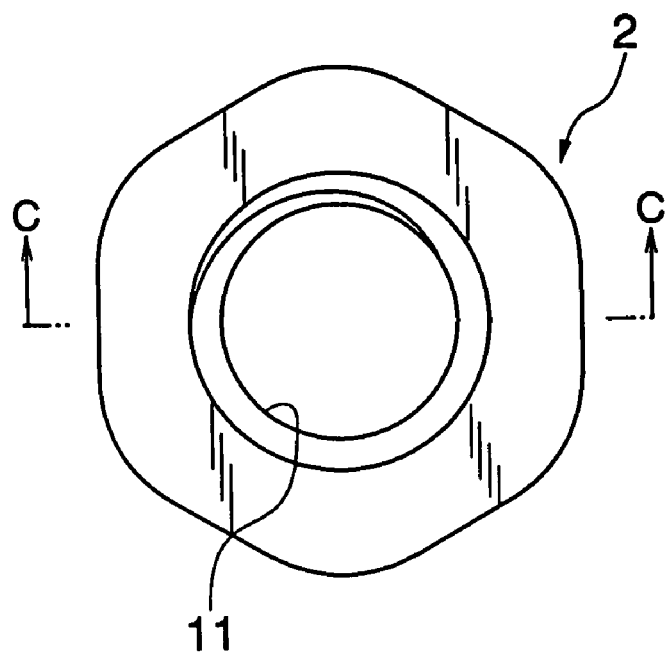
FIG. 5 is a top plan view of an internally threaded portion.
Figure 6:
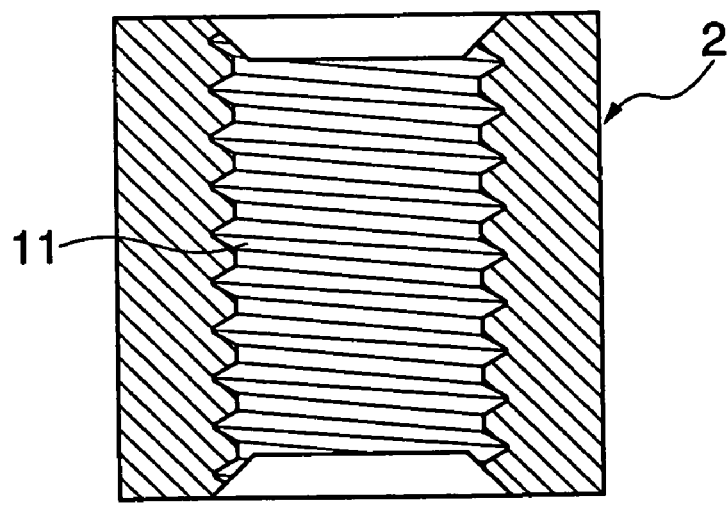
FIG. 6 is a sectional view of the internally threaded portion taken along the line C—C of FIG. 5.
Figure 7:
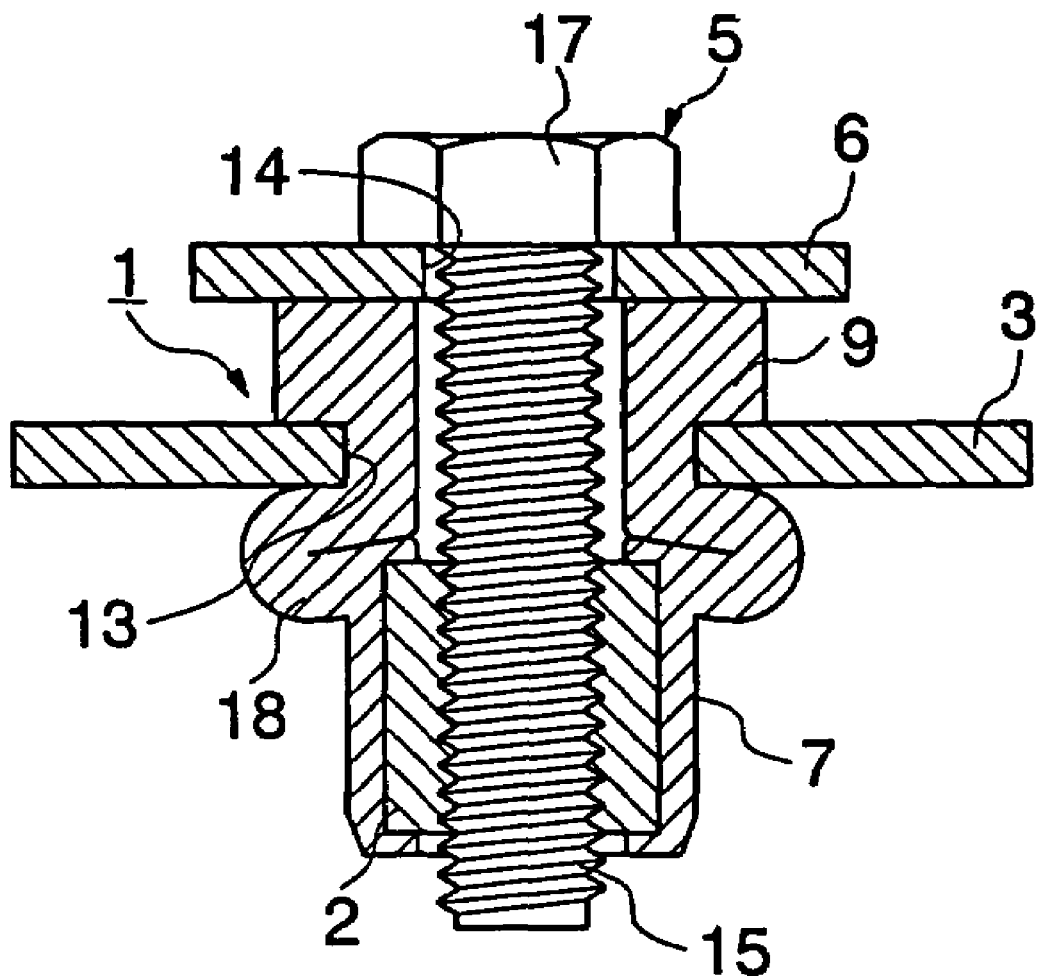
FIG. 7 is a sectional view showing the condition that an elastic fastener of the present invention is used.

With reference to the drawings, an embodiment of the present invention will now be described. FIGS. 1 to 4 show a blind nut type elastic fastener 1 according to the present invention. FIGS. 5 and 6 show an internally threaded portion 2 of the elastic fastener 1. FIG. 7 shows the condition that the elastic fastener 1 is fixed to a workpiece 3 such as a vehicle body by screwing a headed bolt 5 into the elastic fastener, and an attachment member 6 such as a bracket or an attachment panel is fixed to the fastener 1 with the bolt 5

In FIGS. 1 to 4, the elastic fastener 1 comprises a hollow cylindrical portion 7, an internally threaded portion 2 provided at one (lower end) of the ends of the tubular portion 7, and a circular flange 9 formed at the other end (upper end) of the tubular portion. The tubular portion 7 and the flange 9 are not limited to be a round shape, and may be a square or polygonal shape. The tubular portion 7 and the flange 9 are integrally formed with each other and made of an elastic material to elasticize the entire fastener 1. The elastic material of the tubular portion 7 and the flange 9 is an elastomeric material selected from the group consisting of a styrene-based elastomer, a polyamide-based elastomer, a polyester-based elastomer, a urethane-based elastomer and an olefin-based elastomer. The tubular portion 7 and the flange 9 are integrally formed of the elastomeric material selected from the above elastomers. The tubular portion 7 and the flange 9 may be formed by, for example, injection molding.

The tubular portion 7 may have any length suitable for being fixedly attached to the workpiece 3. The fastener 1 is fixedly attached to the workpiece 3 by pulling up the internally threaded portion 2 toward the flange 9 by means of the bolt 5 (FIG. 7) so as to expand a portion of the tubular portion 7 to sandwich the workpiece 3 between the expanded portion and the flange 9. Preferably, the elastomeric material of the flange 9 and the tubular portion 7 has a JIS-A hardness in the range of 40 to 90 degree. This elastomeric material allows the flange 9 and the tubular portion 7 to be formed in a significantly reduced processing time as compared to the chloroprene rubber. Whereas a long forming time is required in the forming process using the chloroprene rubber due to its significant long softening time, the elastomer used in the present invention allows the forming time to be reduced. In practice, the forming time could be reduced down to one-third or less. The tubular portion 7 and the flange 9 formed of the above elastomer has a higher ozone resistance than those formed of the chloroprene rubber. In an experimental test, the fastener of the present invention and a conventional chloroprene rubber fastener each fastened to a workpiece were applied with ozone having a concentration or density of 50±5 pphm at temperature of 40±2 degrees at centigrade (°C.) for 96 hours. As a result, the elastomeric fastener of the present invention had no crack. In contrast, the conventional chloroprene rubber fastener (Hs A 70: Shore hardness A=70) had cracks around the base of the expanded portion. The fastener of the present invention also has a vibration resistance superior to the chloroprene rubber fastener, as described later.

The internally threaded portion 2 is formed independently of both the tubular portion 7 and the flange 9. As shown in FIGS. 3 and 4, the internally threaded portion 2 is embedded in a hole 10 of the tubular portion 7. As shown in FIGS. 4 to 6, the internally threaded portion 2 is formed in a cross-sectional non-circle contour (hexagonal shape in the illustrated embodiment) so as to not rotate with respect to the tubular portion 7. The inner surface of the internally threaded portion 2 is formed with an internal thread 11, and thus the internally threaded portion 2 generally has a nut shape. The internally threaded portion 2 is formed of a high-strength engineering plastic having a strength capable of resisting against a torque of the bolt 5 rotated to expand the tubular portion 7. Specifically, the internally threaded portion 2 is formed of a rigid resin material selected from the group consisting of a polycarbonate (PC) resin, a styrene-based resin, an acrylic-based resin, a polyester-based resin, a nylon-based resin, a modified PPE (polyphenylether) resin and a polymer alloy (polyblend) comprising polycarbonate. The polymer allow (polyblend) composed of polycarbonate consists of either one of PC/ABS (polycarbonate/acrylonitrile butadiene styrene), PC/PET (polycarbonate/polyethylene terephthalate), and PC/PBT (polycarbonate/polybutyrene terephthalate). The internally threaded portion 2 can be formed as a single piece, for example, by injection molding.

Either after the flange 9 and the tubular portion 7 are integrally formed to each other and then the internally threaded portion 2 is formed as a single piece, or after the internally threaded portion 2 is formed as a single piece and then the flange 9 and the tubular portion 7 are integrally formed to each other, the internally threaded portion 2 is joined to the tubular portion 7 in the hole 10 (FIGS. 3 and 4) by fusion bonding. Since the tubular portion 7 is formed of the aforementioned specific elastomeric material and the internally threaded portion 2 is formed of the aforementioned rigid resin material (engineering plastic), the internally threaded portion 2 can be fusedly bonded with the inner surface of the tubular portion 7 by heating without any difficulty, and further the bonding strength is highly maintained. This makes it possible to eliminate the need for adhesive used to join the internally threaded portion 2 to the tubular portion 7. After the fusion bonded, the internally threaded portion 2 are integrally fixed to the integrally formed tubular portion/flange 7, 9, and thereby they are used as the blind nut type elastic fastener 1. In the blind nut. type elastic fastener 1 of the present invention, the internally threaded portion 2 is formed of the specific rigid resin material without need of any metal nut. Thus, the weight of the fastener 1 is significantly reduced. Actually, the weight could be reduced down to one-half or less in comparison with the conventional blind nut.

FIG. 7 shows the condition that the attachment member 6 is attached to the workpiece 3 with the elastic fastener 1. The elastic fastener 1 is used as a reusable or recyclable blind nut. At the first, the tubular portion 7 is inserted into a mounting hole 13 of the workpiece 3 until the flange 9 is brought into surface contact with the workpiece. The headed bolt 5 is then inserted into the tubular portion 7 of the fastener 1 with inserting a threaded shank 15 of the headed bolt into an attaching hole 14 of the attachment member 6 such as a bracket. After the end of the threaded shank 15 of the bolt 5 reaches the threaded portion of the internally threaded portion 2, the bolt 5 is rotated about its axis and screwed into the internally threaded portion 2. By rotating the bolt 5, the bolt 5 goes forward along the internally threaded portion 2, and a head 17 of the bolt 5 will strongly press the attachment member 6 to the flange 9. By further strongly rotating the bolt 5, the threaded shank 15 of the bolt 5 acts to pull the engaged internally threaded portion 2 toward the head 17. Thus, the strong pulling force of the bolt 5 acts on the tubular portion 7 from the internally threaded portion 2, and the region of the tubular portion 7 between the internally threaded portion 2 and the workpiece is expanded as seen in a potion shown by the reference numeral 18 because the tubular portion 7 is formed of elastomeric material.

The expanded portion 18 is brought into strong contact with the peripheral edge of the mounting hole of the workpiece 3 on the opposite side of the flange 9. Thus, the fastener 1 is fixed to the workpiece 3 with sandwiching the workpiece between the expanded portion 18 and the flange 9. At the same time, the attachment member 6 is firmly sandwiched between the head 17 of the bolt 5 and the flange 9. Thus, the attachment member 6 is also attached to the workpiece 3. The flange 9 and the tubular portion 7 made of the elastomer are interposed between the attachment member 6 and the workpiece 3. Further, even though the bolt 5 in contact with the attachment member 6 is screwed into the internally threaded portion 2, the elastic tubular portion 7 is interposed between the bolt 5 and the workpiece 3. This means that an elastomer member is interposed between the workpiece 3 and the attachment member 6, which provides a high vibration isolation effect of not only preventing the transmission of vibration and noise but also absorbing the vibration and noise by the elastomeric material. In addition, a high sealing performance can be obtained because the mounting hole 13 of the workpiece 3 is sealed by the expanded portion 18 of the tubular portion 7 formed of the elastomeric material. Since the elastic fastener 1 is restored to the original configuration by reversely rotating and pulling out the bolt 5, it can be reused. Further, if the end-of-life or defective fastener 1 is discarded, it can be molted and recycled without detaching the internally threaded portion 2 from the tubular portion 7 and flange 9 because the internally threaded portion 2 is not formed of a metal. Even if the workpiece has a substantially or considerably thick thickness into which the tubular portion 7 cannot be inserted up to the intermediate position of the mounting hole of the workpiece, the bolt 5 can be strongly screwed into the tubular portion 7 to expand the tubular portion in the mounting hole and bring the expanded portion into strong contact with the mounting hole so as to fixed the fastener to the workpiece. This also allows the attachment member 6 or the like to be attached to the workpiece.

Figure 8:
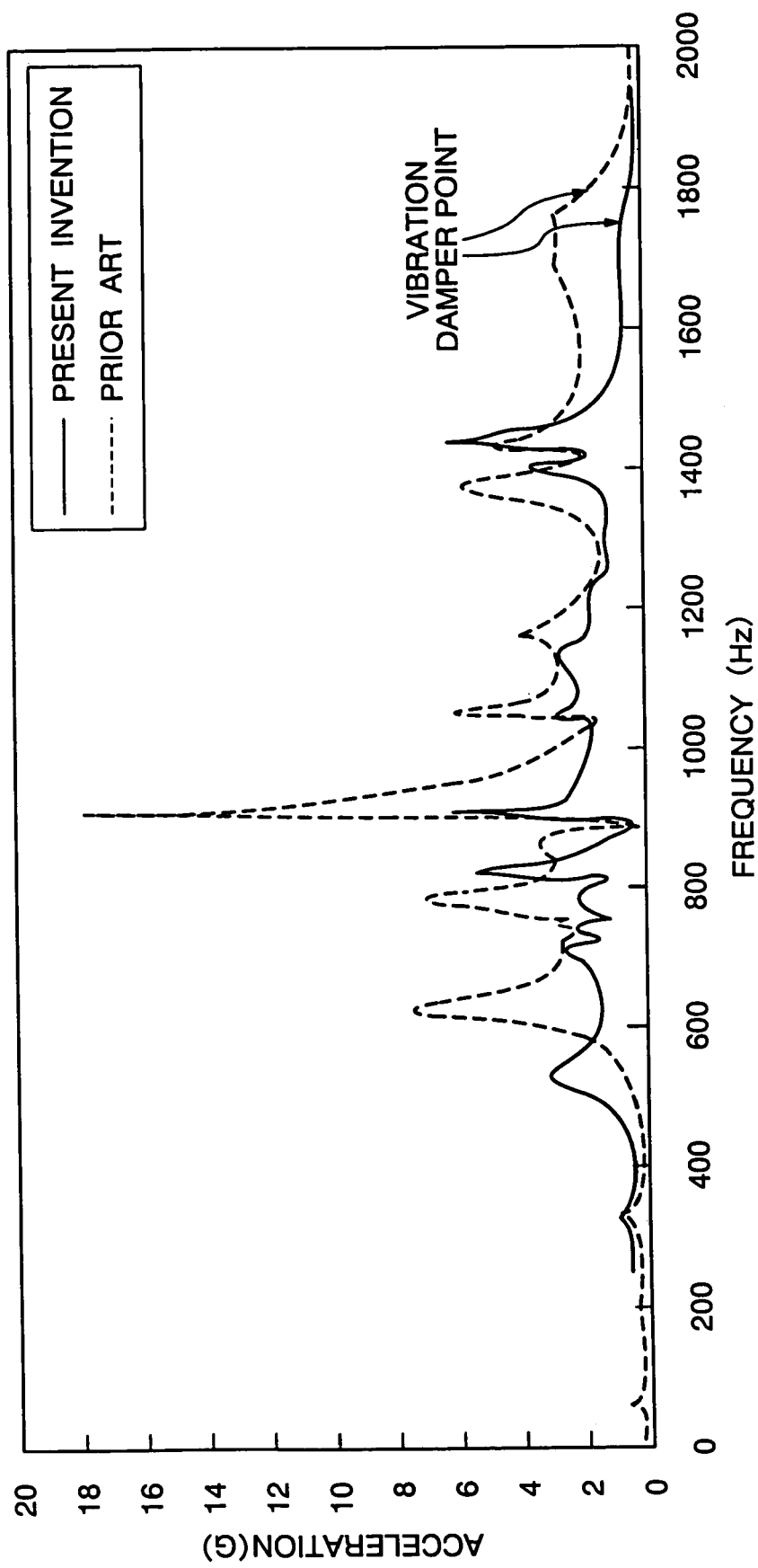
FIG. 8 is a graph showing both vibration insulation characteristics of the elastic fastener of the present invention and a conventional elastic fastener.

FIG. 8 is a graph showing two vibration insulation characteristics of the elastic fastener 1 according to the present invention and the conventional elastic fastener using the chloroprene-rubber and metal internally threaded portion. In the graph, the dotted line shows the characteristic of the conventional elastic fastener and the solid line shows the characteristic of the elastic fastener of the present invention. The test was carried out under the condition that a vibration was applied to each fastener in a shearing direction (a direction perpendicular to the axial direction of the fastener), an input acceleration being a constant value of 1 G (gravity), and frequency being increased from 10 Hz to 2000 Hz for a period of 10 minuets. Each of the fasteners had a mass of 330 grams, four fasteners are fastened to the workpiece.

In the graph of FIG. 8, it can be seen that the conventional chloroprene rubber fastener has variances in the output acceleration and unstable insulation performance in the shearing direction. Particularly in the conventional chloroprene rubber fastener, the output acceleration is significantly varied and the maximum resonance is produced around 900 Hz. In contrast, the fastener of the present invention has generally lower output acceleration and exhibits desirably stable vibration insulation performance without any notable output as in the conventional fastener. This proves that the fastener of the present invention has a high vibration insulation performance. In another test where a vibration was applied in a compression direction (along the axial direction), the substantial same result could be obtained.

According to the present invention, the tubular portion and the flange are formed of the specific elastomeric material, and the internally threaded portion is formed of the specific rigid resin material (high-strength engineering plastic) without using any metal nut. Thus, an overall (or entire) weight reduction of the elastic fastener can be reduced down to one-half or less of that of the conventional elastic fastener, and the availability of fusion bonding for joining the internally threaded portion to the tubular portion allows the need for adhesive to be eliminated. The forming time of the tubular portion and the flange can be reduced down to one-third or less of that of the conventional elastic fastener. Further, undesirable cracks due to ozone can be suppressed to provide enhanced ozone resistance, and vibration resistance can also be enhanced.

We claim:

1. An elastic fastener comprising a hollow tubular portion, an internally threaded portion provided at one of the ends of said tubular portion, and a flange formed at the other end of said tubular portion,
    wherein said tubular portion and said flange are integrally formed with each other and made of an elastomeric material selected from the group consisting of a styrene-based elastomer, a polyamide-based elastomer, a polyester-based elastomer, a urethane-based elastomer and an olefin-based elastomer,
    said internally threaded portion is formed of a rigid resin material selected from the group consisting of a polycarbonate resin, a styrene-based resin, an acrylic-based resin, a polyester-based resin, a nylon-based resin, a modified PPE resin and a polymer alloy composed of polycarbonate,
    said internally threaded portion having a plurality of external surfaces extending the entire axial length thereof and defining a plurality of planer surfaces interconnected by curved surfaces, said internally threaded portion being internally received in a through aperture of said tubular portion, and
    a thermal bond defining an integral connection between said tubular portion and said internally threaded portion.

2. An elastic fastener as defined in claim 1, wherein said elastomeric material of said flange and said tubular portion has a JIS-A hardness in the range of 40 to 90 degree.

3. An elastic fastener as defined in claim 2, wherein said flange and said tubular portion are integrally formed with each other by injection molding, said internally threaded portion being formed as a single piece by injection molding, and said internally threaded portion being joined to said tubular portion by fusion bonding.

4. An elastic fastener as defined in claim 1, wherein said flange and said tubular portion are integrally formed with each other by injection molding, said internally threaded portion being formed as a single piece by injection molding, and said internally threaded portion being joined to said tubular portion by fusion bonding.

5. An elastic fastener comprising:
    a tubular portion defining a through bore, an internally threaded portion provided at a first end of said tubular portion, and a flange formed at a second end of said tubular portion,
    wherein said tubular portion and said flange are a monolithic elastomeric component formed of a first polymer material, and
    said internally threaded portion is formed of a second polymer material, said second polymer material being a rigid resin material, said internally threaded portion defining a plurality of external surfaces comprising planer surfaces extending the entire axial length thereof and interconnected between curved surfaces which are configured to be fixably coupled to a plurality of internal surfaces of the through bore.

6. An elastic fastener as defined in claim 5, wherein said first material has a JIS-A hardness in the range of 40 to 90 degree.

7. An elastic fastener as defined in claim 6, wherein said flange and said tubular portion are integrally formed with each other by injection molding, said internally threaded portion being formed as a single piece by injection molding, and said internally threaded portion being joined to said tubular portion by fusion bonding.

8. An elastic fastener as defined in claim 5, wherein said flange and said tubular portion are integrally formed with each other by injection molding, and wherein said internally threaded portion is formed as a single piece by injection molding, and said internally threaded portion is joined to said tubular portion by fusion bonding.

9. An elastic fastener as defined in claim 5 wherein said tubular portion and said flange are integrally formed with each other and made of an elastomeric material selected from the group consisting of a styrene-based elastomer, a polyamide-based elastomer, a polyester-based elastomer, a urethane-based elastomer and an olefin-based elastomer.

10. An elastic fastener as defined in claim 5 wherein said rigid resin material is selected from the group consisting of a polycarbonate resin, a styrene-based resin, an acrylic-based resin, a polyester-based resin, a nylon-based resin, a modified PPE resin and a polymer alloy composed of polycarbonate.

11. An elastic fastener comprising:
a hollow tubular portion having a flange on one end, the hollow tubular portion being formed of an elastomeric material;
an internally threaded portion having a plurality of external surfaces extending the entire axial length thereof and comprising planer surfaces interconnected between curved surfaces that mate with a corresponding plurality of surfaces of the tubular portion; and
a fusion bond operable to integrally join the internal threaded portion to the tubular portion;
wherein the internally threaded portion is formed of a rigid resin material.

12. The elastic fastener of claim 11, wherein said elastomeric material of said tubular portion is selected from the group consisting of a styrene-based elastomer, a polyamide-based elastomer, a polyester-based elastomer, a urethane-based elastomer and an olefin-based elastomer.

13. The elastic fastener of claim 11, wherein said rigid resin material of said internally threaded portion is selected from the group consisting of a polycarbonate resin, a styrene-based resin, an acrylic-based resin, a polyester-based resin, a nylon-based resin, a modified PPE resin and a polymer alloy composed of polycarbonate.

* * * * *

UNITED STATES PATENT AND TRADEMARK OFFICE
CERTIFICATE OF CORRECTION

| | | |
|---|---|---|
| PATENT NO. | : 7,059,815 B2 | Page 1 of 1 |
| APPLICATION NO. | : 10/812383 | |
| DATED | : June 13, 2006 | |
| INVENTOR(S) | : Toshio Ando et al. | |

It is certified that error appears in the above-identified patent and that said Letters Patent is hereby corrected as shown below:

Column 6,
Line 63, after "surfaces" insert -- extending the entire axial length thereof and --.
Lines 64-65, delete "extending the entire axial length thereof and".

Signed and Sealed this

Twelfth Day of September, 2006

JON W. DUDAS
*Director of the United States Patent and Trademark Office*